United States Patent [19]
Liles et al.

[11] Patent Number: 5,932,651
[45] Date of Patent: Aug. 3, 1999

[54] SILICONE/ORGANIC COPOLYMER EMULSIONS

[75] Inventors: Donald Taylor Liles, Midland, Mich.; David Logan Murray, Fall Branch, Tenn.

[73] Assignee: Dow Corning Corporation, Midland, Mich.

[21] Appl. No.: 08/552,022

[22] Filed: Nov. 2, 1995

[51] Int. Cl.$^6$ ............................ C08L 83/04; C08L 83/16
[52] U.S. Cl. .................. 524/838; 524/506; 524/837; 525/100; 525/102
[58] Field of Search .................... 524/837, 838, 524/506; 525/100, 102

[56] References Cited

U.S. PATENT DOCUMENTS

| | | | |
|---|---|---|---|
| 3,294,725 | 12/1966 | Findlay et al. | 260/29.2 |
| 3,449,293 | 6/1969 | Burzynski et al. | 260/46.5 |
| 3,575,910 | 4/1971 | Thomas | 260/29.6 |
| 3,706,697 | 12/1972 | Backderf | 260/29.2 |
| 3,729,438 | 4/1973 | Plesich et al. | 260/29.6 |
| 3,898,300 | 8/1975 | Hilliard | 260/827 |
| 5,214,095 | 5/1993 | Lavoie | 524/806 |

*Primary Examiner*—Patricia A. Short
*Attorney, Agent, or Firm*—Richard I. Gearhart

[57] ABSTRACT

Emulsion copolymerizing a particular crosslinker, i.e., either a siloxane or silazane, with an organic monomer, results in new and novel emulsions. An emulsion can be formed having particles consisting of polymer chains formed from organic monomer. Depending on the crosslinker and reaction conditions, these emulsion polymer chains can be either crosslinked or uncrosslinked. The uncrosslinked polymer chains can be crosslinked at a later point by the addition of a suitable catalyst.

26 Claims, No Drawings

SILICONE/ORGANIC COPOLYMER EMULSIONS

FIELD OF THE INVENTION

This invention relates to the preparation of novel polymer latices and to the novel polymers derived therefrom, upon the evaporation of water. This invention also relates to novel silicone functional polymer latices which condense into stable crosslinked films upon the evaporation of essentially all the water therefrom.

BACKGROUND OF THE INVENTION

The term "polymer latex" is well known in the art and refers to an aqueous dispersion of a water-insoluble polymer which is present in the form of very fine particles. Polymer latices are often called aqueous emulsion polymers.

Polymer latices have found wide utility as intermediates for surface coating compositions. They are often employed as adhesives and as film forming agents in paint compositions designated for all types of applications.

Those skilled in the art have attempted to prepare polymers incorporating siloxane functionality by utilizing alkoxy silanes or alkoxy silane derivatives. U.S. Pat. No. 3,294,725 describes the aqueous emulsion polymerization of organosiloxanes and silcarbanes without using strong bases or strong mineral acids as the polymerization agent and without using a separate emulsifying agent. The '725 patent describes emulsion polymerization using a combined surface active sulfonic acid catalyst such as for example dodecylbenzene sulfonic acid (DBSA). However, the '725 patent is limited to the homopolymerization of organosiloxanes and silcarbanes, and the copolymerization of various types of organosiloxanes with each other or with silcarbanes.

U.S. Pat. No. 3,449,293 discloses the emulsion polymerization of organosilanes with unsaturated monomers, and more particularly of alkoxy silanes with acrylic esters to produce solid polymers. These solid polymers are disclosed as being insoluble in common organic solvents. This insolubility indicates that the polymers are substantially crosslinked. The solid polymers are disclosed as possessing improved thermal stability as compared with non-crosslinked polymers formed from the polymerization of corresponding unsaturated monomers without siloxane incorporation. The emulsion copolymerization mechanism is described as being a simultaneous addition and condensation reaction initiated using conventional water soluble free radical initiator of the peroxide type, a redox initiator system and emulsifier.

U.S. Pat. No. 3,575,910 is also directed to the preparation of siloxane-acrylate copolymers and aqueous emulsions containing these polymer particles. The copolymers contain 25 to 90 wt. percent acrylate and 10 to 75 wt. percent of a siloxane copolymer formed from 45 to 65 mole percent of D type ($R_2SiO$) monomer and 35 to 55 mole percent of T type ($RSiO_{3/2}$) monomer. Preferably the siloxane-acrylate copolymer is formed by a two stage emulsion polymerization typically involving first forming the siloxane copolymer and secondly polymerizing the acrylate monomers in the presence of, and onto, the siloxane copolymer. An alternate method (example 13) in U.S. Pat. No. 3,575,910 is disclosed by which the acrylate and siloxane monomers are simultaneously polymerized using the stepwise addition of a free radical initiator and a buffer, but without the addition of a strong acid catalyst.

U.S. Pat. No. 3,706,697 discloses a free radical initiated aqueous emulsion polymerization of 55 to 90 percent by weight of an acrylic ester, from about 0.5 to 6 percent by weight of gamma-methacryloxypropyltrimethoxy silane (MATS) or gamma-acryloxypropyltrimethoxy silane and from about 9.5 to 44.5 weight percent of another copolymerizable free radical initiated monomer which does not have siloxane functionality.

U.S. Pat. No. 3,729,438 discloses emulsion polymers containing siloxane functionality formed from copolymers of vinyl acetate and a vinyl hydrolyzable silane, such as for example, MATS or vinyltrimethoxysilane (VTMS). The copolymers are disclosed as capable of post-crosslinking by means of the hydrolyzable siloxane functionality and the means disclosed to attempt to retard premature condensation crosslinking is through pH control of the aqueous emulsion within the range of pH 3.5 to 6.

Excessive premature crosslinking of siloxane-containing emulsion polymers was the problem addressed in Feasibility of Using Alkoxy Silane-Functional Monomers for the Development of Crosslinking Emulsions, T. R. Bourne, B. G. Bufkin, G. C. Wildman and J. R. Grave, Journal of Coatings Technology, Vol. 54, No. 684 January 1982. The authors acknowledge the inability to suppress the hydrolysis-condensation reaction of alkoxy silanes to acceptable levels despite optimizing reaction conditions to provide stable colloidal systems. In order to provide crosslinkable functionality with greater resistance to hydrolysis, the authors proposed using vinyl-type monomers with more sterically hindered alkoxy silane groups such as for example gamma-methacryloxy propylmethyldiethoxy silane (gamma-MAPMDES). However, because of the inability to prevent time dependent and implacable hydrolysis of the (alkyl—O—Si) bond in an aqueous environment, the authors concluded that the use of such sterically hindered alkoxy silane monomers, including gamma-MAPMDES, is limited mainly to applications requiring pre-crosslinked emulsion systems. The final conclusion of the paper was that if alkoxy-silane functional emulsions are to achieve the more ubiquitous status sought by industry for an advanced-generation system, then hydrolysis-resistant monomers or aqueous barrier techniques must be developed to prevent premature crosslinking of the alkoxy silane moiety.

Two references which rely on the crosslinking of siloxane moieties in emulsion copolymers are U.S. Pat. No. 3,898,300 and EPA 0153600. U.S. Pat. No. 3,898,300 discloses that the incorporation of crosslinked polyorganosiloxane particles into a styrenic copolymer matrix can improve impact strength to the polymer. EPA 0153600 discloses that emulsion polymerizing T ($RSiO_{3/2}$) siloxanes with film forming monomers can provide coatings with crosslinked polyorganosiloxane microparticles which can act as rheology modifiers for solvent based formulations.

U.S. Pat. No. 5,214,095 teaches copolymers prepared by a concurrent free radical and cationic initiated emulsion polymerization of at least one free radical initiatable monomer, at least one linear siloxane precursor monomer, and at least one bifunctional silane monomer having both free radical polymerizable and silicon functional groups.

However, none of the aforementioned patents describe the particular method of preparing the novel emulsion polymers of this invention.

SUMMARY OF THE INVENTION

The present invention relates to novel silicone organic latexes and the compositions resulting therefrom. The inventors have discovered that by emulsion copolymerizing a particular crosslinker, i.e., either a siloxane or silazane, with an organic monomer, new and novel emulsions result. According to the invention, an emulsion can be formed having particles consisting of polymer chains formed from organic monomer. Depending on the crosslinker and reaction conditions, these emulsion polymer chains can be either crosslinked or uncrosslinked. The uncrosslinked polymer chains can be crosslinked at a later point by the addition of a suitable catalyst.

The objective of the invention can be achieved by forming an emulsion polymer from its organic monomers and adding a crosslinker. The crosslinker can be copolymerized with the organic monomer at any point during the emulsion polymerization of the organic monomer, i.e., the crosslinker can be added to the emulsion with the organic monomer but before the emulsion polymerization begins, or the crosslinker can be added at a point after most of the organic monomer has been polymerized, or at any point during the emulsion polymerization between these two extremes.

While not wishing to be bound by any particular theory, the present inventors believe that under the proper conditions the Si—O—Si or Si—NR—Si bonds of the crosslinker can be cleaved by water to produce a SiOH functionalized organic latex. This is best accomplished by running the emulsion polymerization at a pH of from 1 to 4, and at a temperature of from 50° C. to 90° C. The SiOH functionalized latex having silicone organic polymer chains can be crosslinked later with the addition of an appropriate catalyst, most likely a tin catalyst.

In the present invention, the crosslinker comprises 0.1 to 20 parts by weight of the polymer latex. The total solids content of the latex ranges from about 20 weight percent up to about 60 weight percent. When essentially all the water is removed from the aforesaid composition, whether crosslinked or uncrosslinked, it is capable of condensing into a clear, stable, cross-linked, polymeric film.

It is an object of this invention to teach a silicone functional polymer latex which may under certain conditions be crosslinked, and under other conditions remain uncrosslinked until a catalyst is added. It is another object of the invention to teach a latex suitable for use in curable coatings, paints, caulks, adhesives, non-woven and woven fabrics, ceramic compositions and as modifiers, processing aids and additives in thermoplastics, cements and asphalts. A further object of this invention is to teach crosslinked polymers derived from said polymers latices suitable for use in these applications. Other objects and advantages of this invention will become readily apparent from the following description and appended claims.

DESCRIPTION OF THE PREFERRED EMBODIMENTS

The polymer latices of this invention are compositions having:
100 parts by weight organic monomer,
0.25 to 7 parts by weight surfactant,
0.1 to 2 parts by weight initiator,
60 to 400 parts by weight water, and
0.1 to 20 parts by weight crosslinker having the formula:

$$Q_nR_{3-n}Si—X—(RQSiX)_z(R_2SiX)_y—SiR_{3-n}Q_n$$

or

-continued
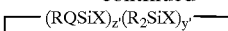

where:
Q independently represents an allyl, vinyl, hexenyl, acryloxy or methacryloxy radical;
X is O, or NR; and
R is independently hydrogen an alkyl, aryl or alkyl/aryl group having up to 8 carbon atoms;
$n$=0, 1, 2, or 3;
$z$=0 to 200;
$y$=0 to 200, with the proviso that if $n$=0, then $z \geq 1$;
$z'$=1 to 50; and
$y'$=0 to 50, with the proviso that $z'+y' \geq 3$.

The present invention is made by forming an emulsion from constituents including the organic monomer, water, and surfactant, such that the organic monomer forms the discontinuous phase, then copolymerizing the organic monomer with a crosslinker, wherein the crosslinker is as described above.

The organic monomers employed to prepare the emulsion polymer of the present invention can be monomers of the formula:

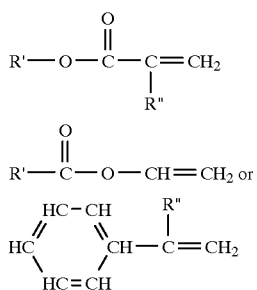

where R' is an alkyl group having 1 to 20 carbon atoms; and
R" is a hydrogen atom or an alkyl group having up to 8 carbon atoms.

Illustrative examples of useful monomers are vinyl acetate, styrene, a-methyl styrene, ethyl acrylate, n-butyl acrylate, tertiary butyl acrylate, isobutyl acrylate, amyl acrylate, ethyl butyl acrylate, 2-ethylhexyl acrylate, octyl acrylate, nonyl acrylate, decyl acrylate, tridecyl acrylate, tetradecyl acrylate, hexadecyl acrylate, octadecyl acrylate, and the like. The most preferred monomers are ethyl acrylate, butyl acrylate and vinyl acetate.

Of course it is to be understood that while it is preferred to employ only one organic monomer at any one time, if desired, the polymer latices can be prepared using mixtures of two or more different organic monomers and such types of compounds are intended to be covered by the term latex or emulsion polymer as used herein.

The organic monomer is polymerized in water in the presence of a surfactant. Any conventional anionic or nonionic surfactant or mixtures thereof can be used in the aqueous dispersion of this invention. Such surfactants are well know in the art and can be found more fully enumerated in "Synthetic Detergents" by J. W. McCutcheon, published by MacNair-Dorland Company, New York. Illustrative examples of such surfactants are the alkali metal salts of rosin acids, alkali metal and ammonium salts of long chain alkyl sulfates and sulfonates and the like; the alkylene oxide condensates of long chain alcohols, fatty acids, and the like.

Among the more preferred surfactants are the alkoxylated condensates of alkyl phenols such as ethylene oxides of octyl and nonyl phenol, alkoxylated condensates of alcohols such as ethylene oxides of lauryl alcohol, the alkali metal alkyl sulfonates such as sodium lauryl sulfonates, and the like. In some instances it is preferred to employ both anionic and nonionic surfactants to help control particle size of the polymer. The amount of surfactant employed in the instant invention can range from about 0.25 to about 7 parts by weight or higher based on 100 parts by weight of solid polymer in the latex. A most preferred surfactant is TRITON X-200 (available from Union Carbide of Danbury, Conn.), which is an aqueous solution of an alkylaryl polyether sodium sulfonate.

The amount of water present in the system is that amount sufficient to produce a polymer latex having a polymer solids content of from about 20 weight percent up to about 60 weight percent. This will correspond to from 60 to 400 parts by weight of water.

An initiator is necessary to begin the emulsion polymerization, and any free radical initiator or mixtures thereof conventionally known in the art can be employed. Specific examples of such initiators are inorganic peroxides such as hydrogen peroxide, ammonium persulfate, potassium persulfate, and the like; organic peroxy catalysts such as the dialkyl peroxides, e.g. diethyl peroxide, diisopropyl peroxide, dilauryl peroxide, dioleyl peroxide, distearyl peroxide, di-(t-butyl) peroxide, di-(t-amyl) peroxide, dicumyl peroxide, and the like; the alkyl hydrogen peroxides such as t-butyl hydroperoxide, t-amyl hydroperoxide, cumene hydroperoxide, diisopropyl benzene hydroperoxide, and the like; the symmetrical diacyl peroxides, such as acetyl peroxide, propionyl peroxide, lauroyl peroxide, stearoyl peroxide, malonyl peroxide, succinoyl peroxide, phthaloyl peroxide, benzoyl peroxide and the like; ketone peroxides such as methyl ethyl ketone peroxide, cyclohexanone peroxide, and the like; the fatty oil acid peroxides, such as coconut oil acid peroxides, and the like; the unsymmetrical or mixed diacyl peroxides such as acetyl benzoyl peroxide, propionyl benzoyl peroxide, and the like; the azo compounds, such as azobisisobutyramidine hydrochloride, 2,2azobis (isobutylronitrile), 2,2azobis (2-methylbutyronitrile), 1,1azobis (1-cyclohexanecarbonitrile), and the like; the disulfide; a redox type catalytic system (i.e. a catalyst and a reductant), such as the sulfate-sulfites, the sulfate-sulfoxylate formaldehyde, the peroxy-sulfites, and the like, such as potassium persulfate and sodium metabisulfite, potassium persulfate and sodium or zinc sulfoxylate formaldehyde, t-butyl hydroperoxide and sodium metabisulfite, potassium persulfate and sodium thiosulfate, and the like; or mixtures of such catalysts. Obviously only a catalytic amount of the initiator need be employed. Generally amounts of initiator ranging from about 0.1 to about 2.0 parts by weight based on 100 parts by weight of organic monomer in the latex will be sufficient for most purposes. The most preferred initiator is ammonium persulfate. Redox type catalyst systems are often useful in speeding up the rate of polymerization of the monomers and/or in reducing the temperature of the polymerization process. Of course it is to be understood that the polymerization of the monomers can be carried out in a closed vessel in an inert atmosphere or under artificially induced pressure or in an open vessel under reflux at atmospheric pressure.

When it is desirable to conduct the emulsion polymerization at a pH above about 1–2, a buffer compound is used. Any conventional buffering agent or mixtures of such agents known in the art can be employed such as sodium acetate, sodium bicarbonate, and the like. Generally amounts of buffer on the order of about 1.0 parts by weight or less based on 100 parts by weight of organic monomer in the latex will be sufficient for most purposes.

While not essential, it is sometimes desirable to include a small amount of chain transfer agent during the polymerization in order that the molecular weight of the polymer can be controlled. Examples of chain transfer agents include alkyl mercaptans such as nonyl mercaptan and the like, and alkyl halides such as carbon tetrabromide and the like. For a discussion on chain transfer agents during free radical polymerization, see Principles of Polymerization, second edition, George Odian, Willey and Sons, New York, N.Y. Pages 233–238.

The preparation of the emulsion polymers of this invention are well known in the art, and can be prepared by a variety of methods. These methods are highlighted generally in the "Encyclopedia of Polymer Science and Engineering", Vol. 6, p. 1–51 (1986, John Wiley & Sons). Generally, the organic monomers are stirred into a water solution containing a surface active agent or surfactant and a water soluble free radical initiator such as ammonium persulfate. After polymerizing, the system consists of finely divided submicron particles stabilized in water.

In accordance with the invention a crosslinker is added to the reaction at a predetermined point. The crosslinkers may be of the formula

or

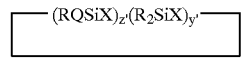

where:
Q independently represents an allyl, vinyl, hexenyl, acryloxy or methacryloxy radical;
X is O, or NR; and
R is independently hydrogen, an alkyl, aryl or alkyl/aryl group having up to 8 carbon atoms;
$\underline{n}$=0, 1, 2, or 3;
$\underline{z}$=0 to 200;
$\underline{y}$=0 to 200, with the proviso that if $\underline{n}$=0, then $\underline{z} \geq 1$;
$\underline{z}'$=1 to 50; and
$\underline{y}'$=0 to 50, with the proviso that $\underline{z}'+\underline{y}' \geq 3$.

The crosslinker is added in an amount comprising 0.1 to 20 parts per 100 parts by weight of the organic monomer, though preferable amounts are 0.5 to 2.0 parts. The preferred crosslinkers are divinyltetra-methyldisiloxane, divinyltetramethyl disilazane, methylvinylcyclosiloxanes and methylvinylcyclosilazanes.

In addition to the above-described reactants, other additives known in the art may also be added, such as amorphous silica, colloidal silica, crystalline silica, clays, aluminum silicate, mica, calcium carbonate, titanium dioxide, aluminum oxide, carbon black or zinc oxide. These additives or fillers may be added at any point in the present method, but are preferably added after all the organic monomer and additional monomer have been polymerized.

A preferred method of producing the emulsion polymer is as follows. Water, the surfactant, such as an aqueous solution of an alkylaryl polyether sodium sulfonate (TRITON X-200), an initiator (ammonium persulfate) and a buffer (sodium bicarbonate) are mixed together, and agitated for 30 minutes at room temperature using a nitrogen purge. Inhibitor-free monomer (prepared by passing the monomer through activated alumina) is added to the reaction mixture all at once. The agitation is maintained and heating is started until an exotherm occurs. The heating is then stopped. When a temperature maximum is obtained, heat is reapplied to the reaction mixture. After the temperature stabilizes, additional monomer is added slowly, preferably dropwise over a two hour period while the reaction temperature is maintained. At some point after ⅓ of the monomer is added, the crosslinker is added along with the remainder of monomer. The final product of this process results in the emulsion polymer used in the practice of the invention. If the reaction is run at a pH of about 7 or greater using a buffer system, the resulting polymer chains in the emulsion are crosslinked. If the reaction is run at a pH below about 7, and particularly if the reaction is run at pH of about 2 and a temperature of from 70–90° C. the resulting polymer chains are uncrosslinked.

While not wishing to be bound by any particular theory the inventors believe that under controlled conditions, i.e., pH below 5, the Si—O—Si bonds or Si—N—Si bonds of the crosslinker cleave during the emulsion polymerization to form Si—OH bonds. The Si—OH functionality between different polymer chains can then condense either on their own or by the addition of an organotin catalyst and/or additive.

The organotin curing catalyst used for the post crosslinking step is an organic salt of tin and may be illustrated by tin (II) carboxylates, such as stannous oleate and stannous naphthanate; dialkyl tin (IV) carboxylates, such as dibutyltin diacetate and dibutyltin dilaurate; and tin (IV) stannoxanes, as exemplified by the structure (Bu)$_2$SnCl—O—(Bu)$_2$OH, in which Bu denotes a butyl radical, as taught by Stein et al. in U.S. Pat. No. 5,034,455. In preferred embodiments, the catalyst is stannous octoate.

In addition to adding the organotin catalyst to crosslink the uncrosslinked polymer latex, an additive may be added which helps facilitate the crosslinking. The additive will be added in an amount of 0.1 to 20 parts per wieght of organic monomer and is of the formula:

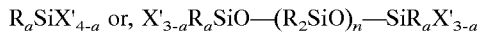

where:
R is independently the same or different monovalent hydrocarbon group having from 1–8 carbon atoms;
X' is any hydrolyzable group; and
a is either 0, 1 or 2.

X' can be any hydrolyzable group. The term "hydrolyzable group" means any group attached to the silicon which is hydrolyzed by water at room temperature. The hydrolyzable group X' includes hydrogen, halogen atoms such as F, Cl, Br or I; groups of the formula —OY when Y is any hydrocarbon or halogenated hydrocarbon group such as methyl, ethyl, isopropyl, octadecyl, allyl, hexenyl, cyclohexyl, phenyl, benzyl, beta-phenylethyl, any hydrocarbon ether radical such as 2-methoxyethyl, 2-ethoxyisopropyl, 2-butoxyisobutyl, p-methoxyphenyl or —(CH$_2$CH$_2$O)$_2$CH$_3$; or any N,N-amino radical such as dimethylamino, diethylamino, ethylmethylamino, diphenylamino, or dicyclohexylamino. X' can also be any amino radical such as NH$_2$, dimethylamino, diethylamino, methylphenylamino or dicyclohexylamino; any ketoxime radical of the formula —ON=CM$_2$ or —ON=CM' in which M is any monovalent hydrocarbon or halogenated hydrocarbon radical such as those shown for Y above and M' in any divalent hydrocarbon radical both valences of which are attached to the carbon, such as hexylene, pentylene or octylene; ureido groups of the formula —N(M)CONM"$_2$ in which M is defined above hydrocarbon radical such as those shown for Z above and M" is H or any of the M radicals; carboxyl groups of the formula —OOCMM" in which M and M" are defined above or halogenated hydrocarbon radical as illustrated for Y above, or carboxylic amide radicals of the formula —NMC=O(M") in which M and M" are defined above. X' can also be the sulfate group or sulfate ester groups of the formula —OSO$_2$(OM) where M is defined above hydrocarbon or halogenated hydrocarbon radical illustrated for Y; the cyano group; the isocyanate group; and the phosphate group or phosphate ester groups of the formula —OPO(OM)$_2$ in which M is defined above.

The most preferred hydrolyzable groups of the invention are alkoxy groups. Illustrative examples of the alkoxy groups are methoxy, ethoxy, propoxy, butoxy, isobutoxy, pentoxy, hexoxy, 2-ethylhexoxy, and the like; alkoxyalkoxy radicals such as methoxymethoxy, ethoxymethoxy, and the like; and alkoxyaryloxy such as ethoxyphenoxy and the like. The most preferred alkoxy groups are methoxy or ethoxy.

Such unsaturated silane monomers as well as methods for their preparation are well known in the art. Illustrative of the more preferred silanes that can be employed are for example, vinyltrimethoxysilane, vinyltriethoxysilane, vinyldimethylethoxysilane, gammamethacryloxypropylmethyldiethoxysilane, vinylmethyldimethoxysilane, vinylmethyldiethoxysilane, vinyltris (2-methoxyethoxy) silane, gamma-methacryloxypropyltrimethoxysilane, vinyltriacetoxysilane, and the like.

The polymer latices of this invention have a wide degree of utility in surface coatings, paints, stains, sealants and adhesives. The instant polymer latices are particularly unique in that the polymers can form crosslinked coatings merely upon drying, i.e. removal of the water from the polymer latex. The crosslinked protective polymeric films derived from said polymer latices are insoluble in toluene, water and acetone and exhibit excellent water and solvent resistance. In addition they are very durable and exhibit a very high degree of scrub resistance and are particularly useful as additives for high pigment volume concentration paint formulations. When used unpigmented the crosslinked films produce a clear, high gloss coating. Pigmented and unpigmented films may be used as primers, undercoatings or top coatings on porous or nonporous substrates, such as metal, cement, wood, wood fiber, mineral fibers, wall board, and the like. In addition to paints and architectural coatings, those skilled in the art will appreciate that the polymer latices of this invention are useful for textile treatments, paper coatings, sealants, and adhesives.

The following examples are illustrative of the present invention and are not to be regarded as limitative.

EXAMPLE 1

In a 3 liter, 3 neck flask equipped with a mechanical stirrer, a condenser, an addition funnel, a thermometer, a heating mantel (having a temperature controller) and a nitrogen purge was added 758 g of deionized (DI) water, 72.9 g of a 28 percent aqueous solution of an alkylaryl polyether sodium sulfonate (TRITON X-200), 3.75 g of ammonium persulfate and 3.0 g of sodium bicarbonate. The contents of the flask were stirred for 30 minutes at room temperature while a nitrogen purge was maintained. Inhibitor-free ethylacrylate, 226 g, (prepared by passing 500 g of ethylacrylate through a bed of 100 g of 200–400 mesh activated alumina) was added to the flask all at once, stirring was maintained and heating was started. Approximately 45 minutes later, when the temperature reached 66° C., an exotherm occurred and the heating mantle was removed. A temperature maximum of 94° C. was obtained approximately 4 minutes later. The heating mantle was reinstalled and heat was applied to the flask after about 20 minutes when the temperature had stabilized at 70° C. An additional 225 g of ethylacrylate was added dropwise over a two hour period while the temperature was maintained at 70° C. Next a solution of 12.56 g of divinyltetramethyldisiloxane in 225 g of ethylacrylate was added to the flask dropwise also over a two hour period. After all of the feed solution had been added, the emulsion was heated with stirring for 60 minutes longer while the temperature was maintained at 70° C. The heating mantel was removed and the emulsion was allowed to cool to room temperature with stirring. The contents of the flask were filtered through a 149 um polypropylene filter and later heated to 50° C. for 30 minutes in vacuo using a rotary evaporator. 7.8 g of material remained in the filter and 98.4 g of condensate (including water) was collected in the evaporator receiver. The recovered emulsion weighed 1351 g and it had a non-volatile content of 49.5 percent by weight. The emulsion had a mean particle size of 168 nm and 99 percent of the particles were less than 257 nm, determined by light scattering (NIACOMP). The emulsion had a viscosity of 32.0 cps (Brookfield, #1 spindle, 60 RPM) and a minimum film forming temperature below −5° C. This latex consisted of an emulsion of polyethylacrylate containing 1.0 mole percent divinyltetramethyldisiloxane.

Films were cast by pouring 11 g of emulsion into 100 mm diameter polystyrene Petri dishes that had been previously coated with a thin film of silicone grease. The emulsion films were allowed to dry at ambient conditions for 7 days after which tensile properties were determined (Instron). Swelling properties of the latex films were also determined using ethyl acetate as solvent. Swelling and tensile properties are given in Table I.

EXAMPLE 2

Using the same procedure as in Example 1, another latex was prepared such that it consisted of an aqueous emulsion of polyethylacrylate that contained 2.0 mole percent divinyltetramethyldisiloxane. This emulsion was prepared using the same procedure as that of Example 1 except that 25.12 g of $(H_2C=CHMe_2SI)_2O$ was used. This latex had a mean particle size of 187 nm with 99 percent of the particles less than 330 nm and it had a non-volatile content of 48.9 percent by weight. The emulsion had a viscosity of 35.1 cps (Brookfield, #1 spindle, 60 RPM) and a minimum film forming temperature below −5° C. Swelling and tensile properties of films from this emulsion were also determined and they are presented in Table I.

EXAMPLE 3

Using the same procedure of Example 1, another emulsion was prepared such that it consisted of an aqueous emulsion of polyethylacrylate containing 1.0 mole percent divinyltetramethyldisilazane. In this procedure, 12.47 g of $(H_2C=CHMe_2Si)_2NH$ was substituted for the $(H_2C=CHMe_2Si)_2O$. This emulsion had a mean particle size of 211 nm with 99 percent of the particles less than 266 nm and it had a non-volatile content of 49.3 percent by weight. The emulsion had a viscosity of 23.0 cps (Brookfield, #1 spindle, 60 RPM) and a minimum film forming temperature below −5° C. Swelling and tensile properties of films from this emulsion were determined and they are presented in Table I.

EXAMPLE 4

Using the same procedure of Example 1, another emulsion was prepared such that it consisted of an aqueous of polyethylacrylate containing 2.0 mole percent divinyltetramethyldisilazane. In this procedure, 24.94 g of $(H_2C=CHMe_2Si)_2NH$ was substituted for the $(H_2C=CHMe_2Si)_2O$. This emulsion had a mean particle size of 244 nm with 99 percent of the particles less than 365 nm and it had a non-volatile content of 48.7 percent by weight. The emulsion also had a viscosity of 18.0 cps (Brookfield, #1 spindle, 60 RPM) and a minimum film forming temperature below −5° C. Swelling and tensile properties of films from this emulsion were determined and they are presented in Table I.

EXAMPLE 5

Using a modified procedure of Example 1, another latex was prepared such that it consisted of an aqueous emulsion of polyethylacrylate containing 0.5 mole percent methylvinylcyclotrisiloxane. When preparing this latex, the same procedure of Example 1 was used except that the amount of sodium bicarbonate used was doubled (6 g added) and 2.9 g of $(H_2C=CHMeSiO)_3$ was substituted for the $(H_2C=CHMe_2Si)_2O$. During the preparation of this latex, 7.2 g of coagulum was collected by filtration, 118.9 g of volatiles was collected by stripping and 1323 g of latex was recovered. The latex had a mean particle size of 192 nm with 99 percent of the particles less than 286 nm and it had a non-volatile content of 50.4 percent by weight. The emulsion had a viscosity of 30.4 cps (Brookfield, #1 spindle, 60 RPM) and a minimum file forming temperature below −5° C. Swelling and tensile properties of films from this emulsion were determined and they are given in Table I.

EXAMPLE 6

Using the same procedure of Example 1, another latex was prepared such that it consisted of an aqueous emulsion of polyethylacrylate containing 0.5 mole percent methylvinylcyclotrisiloxane. In this procedure, 2.9 g of $(H_2C=CHMeSiO)_3$ was substituted for the $(H_2C=CHMe_2Si)_2O$. During the preparation of this latex, 8.5 g of coagulum was collected by filtration, 110.4 g of volatiles was collected by stripping and 1328 g of latex was recovered. The latex had a mean particle size of 174 nm with 99 percent of the particles less than 255 nm and it had a non-volatile content of 49.9 percent by weight. The emulsion had a viscosity of 33.0 cps (Brookfield, #1 spindle, 60 RPM) and a minimum film forming temperature below −5° C. Swelling and tensile properties of films from this emulsion were determined and they are given in Table I.

EXAMPLE 7

Using the same procedure of Example 1, another latex was prepared such that it consisted of an aqueous emulsion of polyethylacrylate containing 2.5 mole percent methylvinylcyclotrisiloxane. In this procedure, 14.5 g of $(H_2C=CHMeSiO)_3$ was substituted for the $(H_2C=CHMe_2Si)_2O$. During the preparation of this latex, 6.4 g of coagulum was collected by filtration, 120.1 g of volatiles was collected by stripping and 1325 g of latex was recovered. The latex had a mean particle size of 173 nm with 99 percent of the particles less than 264 nm and it had a non-volatile content of 50.7 percent by weight. The emulsion had a viscosity of 38.0 cps (Brookfield, #1 spindle, 60 RPM) and a minimum film forming temperature below −5° C. Swelling and tensile properties of films from this emulsion were determined and they are given in Table I.

EXAMPLE 8

A comparative sample of an aqueous emulsion of ethyl acrylate with no silicone was prepared according to the following procedure. In a 3 liter, 3 neck flask equipped with a mechanical stirrer, a condenser, an addition funnel a thermometer, a heating mantel (having a temperature controller) and a nitrogen purge was added 758 g of deionized (DI) water, 72.9 g of a 28 percent aqueous solution of an alkylaryl polyether sodium sulfonate (TRITON X-200), 3.75 g of ammonium persulfate and 3.0 g of sodium bicarbonate. The contents of the flask were stirred for 60 minutes at room temperature while a nitrogen purge was maintained. 225 g of inhibitor-free ethylacrylate (prepared by passing 500 g of ethylacrylate through a bed of 100 g of 200–400 mesh activated alumina) was added to the flask all at once, stirring was maintained and heating was started. Approximately 30 minutes later, when the temperatures reached 73° C., an exotherm occurred and the heating mantle was removed. A temperature maximum of 93.5° C. was obtained approximately 3 minutes later. The heating mantle was reinstalled and heat was applied to the flask after about 20 minutes when the temperature had stabilized at 70° C. An additional 450 g of ethylacrylate was added dropwise over a 3 and ½ hour period while the temperature was maintained at 70° C. After all of the feed solution had been added, the emulsion was heated with stirring for 60 minutes longer while the temperature was maintained at 70° C. The heating mantle was removed and the emulsion was allowed to cool to room temperature with stirring. The contents of the flask were filtered through a 149 um polypropylene filter and later heated to 50° C. for 30 minutes in vacuo using a rotary evaporator. 5.1 g of material remained in the filter and 93.7 g of condensate was collected in the evaporator receiver. The recovered emulsion weighed 1350 g and it had a non-volatile content of 49.4 percent by weight. The emulsion had a mean particle size of 168 nm and 99 percent of the particles were less than 248 nm, as determined by light scattering (NIACOMP). The emulsion had a viscosity of 30.7 cps (Brookfield, #1 spindle, 60 RPM) and a minimum film forming temperature below −5° C. This latex consisted of an aqueous emulsion of polyethylacrylate.

Films were cast by pouring 11 g of emulsion into 100 mm diameter polystyrene Petri dishes that had been previously coated with a thin film of silicone grease. The emulsion films were allowed to dry at ambient conditions for 7 days after which tensile properties were determined (Instron). Swelling properties of the latex films were also determined using ethyl acetate as solvent. Swelling and tensile properties are given in Table I.

TABLE I

| silane | mole % | swell % | gel % | tensile pis | elong. % | 100% M psi |
|---|---|---|---|---|---|---|
| none | 0.0 | dissolved | | 44 | 1032 | 19 |
| $(H_2C=CHMe_2Si)_2O$ | 1.0 | dissolved | | 41 | 578 | 19 |
| $(H_2C=CHMe_2Si)_2O$ | 2.0 | dissolved | | 34 | 508 | 15 |
| $(H_2C=CHMe_2Si)_2NH$ | 1.0 | 5279 | 64.7 | 61 | 2133 | 17 |
| $(H_2C=CHMe_2Si)_2NH$ | 2.0 | 4882 | 72.2 | 129 | 1994 | 16 |
| $(H_2C=CHMeSiO)_3$ | 0.5 | dissolved | | 47 | 1065 | 28 |
| *$(H_2C=CHMeSiO)_3$ | 0.5 | 4410 | 80.1 | 81 | 851 | 28 |
| $(H_2C=CHMeSiO)_3$ | 2.5 | dissolved | | 43 | 427 | 31 |

*double the amount of $NaHCO_3$

EXAMPLE 9

An aqueous silicone/butyl acrylate emulsion was prepared according to the following procedure. In a 3 liter, 3 neck flask equipped with a mechanical stirrer, a condenser, an addition funnel a thermometer, a heating mantel (having a temperature controller) and a nitrogen purge was added 758 g of deionized (DI) water, 72.9 g of a 28 percent aqueous solution of an alkylaryl polyether sodium sulfonate (TRITON X-200), 3.75 g of ammonium persulfate and 3.0 g of sodium bicarbonate. The contents of the flask were stirred for 30 minutes at room temperature while a nitrogen purge was maintained. 225 g of inhibitor-free butylacrylate (prepared by passing 500 g of butylacrylate through a bed of 100 g of 200–400 mesh activated alumina) was added to the flask all at once, stirring was maintained and heating was started. Approximately 30 minutes later, when the temperature reached 68° C., an exotherm occurred and the heating mantle was removed. A temperature maximum of 88.5° C. was obtained approximately 6 minutes later. The heating mantle was reinstalled and heat was applied to the flask after about 20 minutes when the temperature had stabilized at 70° C. An additional 225 g of butylacrylate was added dropwise over a 1 and ½ hour period while the temperature was maintained at 70° C. Next a solution of 9.8 g of divinyltetramethyldisiloxane in 225 g of butylacrylate was added to the flask dropwise also over a 1 and ½ hour period. After all of the feed solution had been added, the emulsion was heated with stirring for 60 minutes longer while the temperature was maintained at 70° C. The heating mantle was removed and the emulsion was allowed to cool to room temperature with stirring. The contents of the flask were filtered through a 149 um polypropylene filter and later heated to 50° C. for 30 minutes in vacuo using a rotary evaporator. 103.4 g of material remained in the filter and 107.6 g of condensate was collected in the evaporator receiver. The recovered emulsion weighed 1254.7 g and it had a non-volatile content of 47.2 percent by weight. The emulsion had a mean particle size of 153 nm and 99 percent of the particles were less than 260 nm, as determined by light scattering (HIACOMP). The emulsion had a viscosity of 31.0 cps (Brookfield, #1 spindle, 60 RPM) and a minimum film forming temperature below −5° C. This latex consisted of an aqueous emulsion of polybutylacrylate containing 1.0 mole percent divinyltetramethyldisiloxane.

Films were cast by pouring 11 g of emulsion into 100 mm diameter polystyrene Petri dishes that had been previously coated with a thin film of silicone grease. The emulsion films were allowed to dry at ambient conditions for 7 days after which swelling properties were determined using ethyl acetate as solvent. Swelling properties are given in Table II.

EXAMPLE 10

Using the same procedure as in Example 9 another latex was prepared such that it consisted of an aqueous emulsion of polybutylacrylate that contained 2.0 mole percent divinyltetramethyldisiloxane. This emulsion was prepared using the same procedure as Example 6 except that 19.6 g of $(H_2C=CHMe_2Si)_2O$ was used. During the preparation of this latex, 8.5 g of coagulum was collected by filtration, 108.7 g of volatiles were collected by stripping and 1354 g of latex was collected. The latex had a mean particle size of 143 nm with 99 percent of the particles less than 198 nm and it had a non-volatile content of 49.7 percent by weight. The emulsion had a viscosity of 22.4 cps (Brookfield, #1 spindle, 60 RPM) and a minimum film forming temperature below −5° C. Swelling properties of films from this emulsion were also determined using ethyl acetate as solvent and they are given in Table II.

EXAMPLE 11

Another latex was prepared such that it consisted of an aqueous emulsion of polybutylacrylate that contained 1.0 mole percent divinyltetramethyldisilazane. This emulsion was prepared using the same procedure as that of Example 9 except that 9.74 g of (H$_2$C=CHMe$_2$Si)$_2$O was used. During the preparation of this latex, 39 g of coagulum was collected by filtration, 112.8 g of volatiles was collected by stripping and 1312 g of latex was obtained. The latex had a mean particle size of 164 nm with 99 percent of the particles less than 261 nm and it had a non-volatile content of 48.8 percent by weight. The emulsion had a viscosity of 43.0 cps (Brookfield, #1 spindle, 60 RPM) and a minimum film forming temperature below −5° C. Swelling properties of films from this emulsion were also determined using ethyl acetate as solvent and they are given in Table II.

TABLE II

| silane | mole % | % swell | % gel |
|---|---|---|---|
| none | 0.0 | dissolved | |
| (H$_2$C=CHMe$_2$Si)$_2$O | 1.0 | dissolved | |
| (H$_2$C=CHMe$_2$Si)$_2$O | 2.0 | dissolved | |
| (H$_2$C=CHMe$_2$Si)$_2$NH | 1.0 | 5323 | 84.3 |

EXAMPLE 12

100 g of the emulsion described in Example 1 was weighed into a 500 ml jar equipped with a mechanical stirrer. 0.5 g of methyltrimethoxysilane was added to the emulsion with stirring followed by 0.5 g of a 50 percent aqueous emulsion of dioctyltindioctoate. The latex was stirred for 3 minutes after addition of the silane and tin catalyst. This emulsion consisted of a latex of polyethylacrylate/0.5 mole percent (H$_2$C=CHMe$_2$Si)$_2$O, 0.5 parts MeSi(OMe)$_3$ plus 0.25 parts dioctyltindilaurate (parts based on 100 parts of polymer dry weight). Films of this latex were cast according to the procedure of Example 1 and swelling properties were determined using ethyl acetate as solvent. Using the same procedure, MeSi(OCH$_3$)$_3$ and tin catalyst were added to the emulsions described in Examples 2–4 and Example 8. Swelling properties of these latex films are given in Table III.

TABLE III

| latex from | phr CH$_3$Si(OCH$_3$)$_3$ | + | Sn catalyst* | % swell | % gel |
|---|---|---|---|---|---|
| Example 8 (control) | 0.0 | | 0.0 | dissolved | |
| Example 8 (control) | 1.0 | | 0.25 | dissolved | |
| Example 1 | 0.0 | | 0.0 | dissolved | |
| Example 1 | 1.0 | | 0.25 | dissolved | |
| Example 2 | 0.0 | | 0.0 | dissolved | |
| Example 2 | 1.0 | | 0.25 | 4534 | 75.1 |
| Example 3 | 0.0 | | 0.0 | 5279 | 64.7 |
| Example 3 | 1.0 | | 0.25 | 3170 | 70.4 |
| Example 4 | 0.0 | | 0.0 | 4882 | 72.2 |
| Example 4 | 1.0 | | 0.25 | 2734 | 71.8 | phr = parts per hundred parts of polymer solids. Sn catalyst = dibutyltindilaurate also as phr on solids basis.

We claim:

1. A composition comprising 100 parts by weight organic monomer, 0.25 to 7.0 parts by weight surfactant, 0.1 to 2.0 parts by weight initiator, 60 to 400 parts by weight water, and 0.1 to 20 parts by weight of a crosslinker having the formula:

or

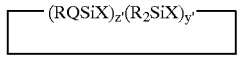

where:

Q independently represents an allyl, vinyl, hexenyl, acryloxy or methacryloxy radical;

X is NR; and

R is independently hydrogen, an alkyl, aryl or alkyl/aryl group having up to 8 carbon atoms;

$\underline{n}$=0, 1, 2, or 3;

$\underline{z}$=0 to 200;

$\underline{y}$=0 to 200, with the proviso that if $\underline{n}$=0, then $\underline{z} \geq 1$;

$\underline{z'}$=1 to 50; and $\underline{y'}$=0 to 50, with the proviso that $\underline{z'}+\underline{y'} \geq 3$.

2. The composition of claim 1 which also includes a tin catalyst.

3. The composition of claim 2, wherein the components have been combined to form an emulsion, and the water is thereafter evaporated to form a crosslinked coating.

4. The composition of claim 1 which also includes an additive of the formula

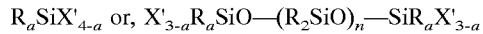

where:

R is independently the same or different monovalent hydrocarbon group having from 1–8 carbon atoms;

X' is any hydrolyzable group; and $\underline{a}$ is either 0, 1 or 2.

5. The composition of claim 1 which also includes a filler.

6. The composition of claim 1 which also includes colloidal silica.

7. The composition of claim 1 which also includes a buffer.

8. The composition of claim 1 which also includes a chain transfer agent.

9. The composition of claim 1 wherein the pH of the composition is maintained at about 7 or greater.

10. The composition of claim 1 wherein the pH of the composition is maintained below 7.

11. The composition of claim 1, wherein the components have been combined to form an emulsion, and the water is thereafter evaporated to form a crosslinked coating.

12. A method for producing a silicone organic copolymer latex, comprising the steps of:

forming an emulsion comprising an organic monomer, water, and a surfactant, such that the organic monomer forms the discontinuous phase, copolymerizing the organic monomer with a crosslinker, wherein the crosslinker has the formula:

or

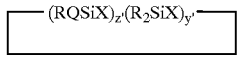

where:

Q independently represents an allyl, vinyl, hexenyl, acryloxy or methacryloxy radical;

X is O, or NR; and

R is independently hydrogen, an alkyl, aryl or alkyl/aryl group having up to 8 carbon atoms;

$n=0, 1, 2,$ or $3$;
$z=0$ to $200$;
$y=0$ to $200$, with the proviso that if $n=0$, then $z \geq 1$;
$z'=1$ to $50$; and
$y'=0$ to $50$, with the proviso that $z'+y' \geq 3$.

13. The method of claim 12, wherein the surfactant is added in an amount of 0.25 to 7.0 parts by weight of organic monomer.

14. The method of claim 13, comprising the additional step of evaporating the water to form a crosslinked coating, after the organic monomer is copolymerized with the crosslinker.

15. The method of claim 12, wherein an initiator is added in an amount of 0.1 to 2.0 parts by weight of organic monomer.

16. The method of claim 12, wherein water is added in an amount of 60 to 400 parts by weight of organic monomer.

17. The method of claim 12, wherein the crosslinker comprises 0.1 to 20% by weight of organic monomer.

18. The method of claim 12 comprising the additional step of adding a filler.

19. The method of claim 12 comprising the additional step of adding colloidal silica.

20. The method of claim 12 comprising the additional step of adding a buffer.

21. The method of claim 12 comprising the additional step of adding a chain transfer agent.

22. The method of claim 12 wherein the pH of the composition is maintained at about 7 or greater.

23. The method of claim 12 wherein the pH of the composition is maintained below 7.

24. The method of claim 12, comprising the additional step of evaporating the water to form a crosslinked coating after the organic monomer is copolymerized with the crosslinker.

25. The method of claim 12 which also includes an additive of the formula $R_a SiX'_{4-a}$ or, $X'_{3-a} R_a SiO-(R_2 SiO)_n-SiR_a X'_{3-a}$ where:
R is independently the same or different monovalent hydrocarbon group having from 1–8 carbon atoms;
X' is any hydrolyzable group; and
$a$ is either 0, 1 or 2.

26. The composition made by the method of claim 12.

* * * * *